United States Patent
Choi et al.

(10) Patent No.: US 9,363,728 B2
(45) Date of Patent: Jun. 7, 2016

(54) METHOD AND APPARATUS FOR BALANCING CELL LOAD IN WIRELESS COMMUNICATION SYSTEM

(71) Applicant: Samsung Electronics Co. Ltd., Suwon-si, Gyeonggi-do (KR)

(72) Inventors: Jung-Min Choi, Osan-si (KR); Dae-Joong Kim, Yongin-si (KR); Han-Seok Kim, Seoul (KR); Jeong-Jae Won, Hwaseong-si (KR); Hwa-Jin Cha, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/048,810

(22) Filed: Oct. 8, 2013

(65) Prior Publication Data

US 2014/0099954 A1 Apr. 10, 2014

(30) Foreign Application Priority Data

Oct. 9, 2012 (KR) .................... 10-2012-0111851
Oct. 8, 2013 (KR) .................... 10-2013-0119807

(51) Int. Cl.
*H04W 36/00* (2009.01)
*H04W 36/22* (2009.01)
*H04W 28/08* (2009.01)

(52) U.S. Cl.
CPC .............. *H04W 36/22* (2013.01); *H04W 28/08* (2013.01)

(58) Field of Classification Search
CPC . H04L 67/1002; H04L 47/125; H04L 67/101; H04L 67/1029; H04L 47/14; H04W 28/08; H04W 84/12; H04W 36/22; H04W 28/02
See application file for complete search history.

(56) References Cited

U.S. PATENT DOCUMENTS

| | | | |
|---|---|---|---|
| 2006/0128394 A1* | 6/2006 | Turina et al. | 455/453 |
| 2007/0060169 A1* | 3/2007 | Johansson et al. | 455/453 |
| 2009/0022298 A1* | 1/2009 | Qiu et al. | 379/211.01 |
| 2011/0078303 A1* | 3/2011 | Li et al. | 709/224 |
| 2011/0171952 A1* | 7/2011 | Niu | 455/422.1 |
| 2012/0170548 A1* | 7/2012 | Rajagopalan et al. | 370/331 |

\* cited by examiner

*Primary Examiner* — Ajit Patel
(74) *Attorney, Agent, or Firm* — Jefferson IP Law, LLP

(57) ABSTRACT

A method and an apparatus for balancing a load by taking into consideration a load of each mobile communication network (Public Land Mobile Network (PLMNs)) of a network sharing architecture are provided. A base station apparatus of a communication system having a network sharing architecture capable of serving at least one mobile terminal via at least two PLMNs is provided. The apparatus includes a load calculator and a load balancing controller. The load calculator is configured to calculate respective loads of the PLMNs. When a first network of the PLMNs is overloaded, the load balancing controller is configured to balance an overload to the first network included in cells neighboring a serving cell.

24 Claims, 20 Drawing Sheets

METHOD AND APPARATUS FOR BALANCING CELL LOAD IN WIRELESS COMMUNICATION SYSTEM

CROSS-REFERENCE TO RELATED APPLICATION(S)

This application claims the benefit under 35 U.S.C. §119 (a) of a Korean patent application filed on Oct. 9, 2012 in the Korean Intellectual Property Office and assigned Serial No. 10-2012-0111851 and a Korean patent application filed on Oct. 8, 2013 in the Korean Intellectual Property Office and assigned Serial No. 10-2013-0119807, the entire disclosures of which are hereby incorporated by reference.

TECHNICAL FIELD

The present disclosure relates to a method for balancing a cell load in a communication system. More particularly, the present disclosure relates to a method for balancing a cell load in a communication system of a network sharing architecture.

BACKGROUND

A network sharing architecture enables different Core Network (CN) operators to access a shared Radio Access Network (RAN). The operators share not only radio network elements but also radio resources. A representative example of this network sharing architecture includes a Multi-Operator Core Network (MOCN). The MOCN denotes a system where a plurality of CN nodes share the same RAN, and the plurality of CN nodes are operated by different operators. For example, a Public Land Mobile Network (PLMN) denotes a network of a mobile communication business, and this PLMN may be operators of the MOCN.

Meanwhile, 3rd Generation Partnership Project (3GPP) standard TS 36.423 Rel. 9 defines a message for load information exchange on a cell basis. However, currently, a load balancing method considering RAN sharing does not exist. For example, U.S. Patent Application Publication No. US 2011/0171952 filed on Mar. 23, 2011 and published on Jul. 14, 2011, titled "CELL LOAD BALANCING METHOD, CELL LOAD MEASURING METHOD, AND DEVICES THEREOF" discloses cell load information related to the above standard, and also discloses a method for exchanging the cell load information with a neighbor cell, and controlling a handover parameter to perform a load balancing operation. Therefore, a new load balancing method under an environment sharing a RAN such as an MOCN is required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for balancing a cell load in a communication system of a network sharing architecture.

Another aspect of the present disclosure is to provide a method and an apparatus for exchanging cell load information in a communication system of a network sharing architecture.

Still another aspect of the present disclosure is to provide a method and an apparatus for balancing a load by taking into consideration a load for each Public Land Mobile Network (PLMN) in a communication system of a network sharing architecture.

In accordance with an aspect of the present disclosure, a base station apparatus of a communication system having a network sharing architecture capable of serving at least one mobile terminal via at least two PLMNs is provided. The apparatus includes a load calculator configured to calculate respective loads of the PLMNs, and a load balancing controller configured to, when a first network of the PLMNs is overloaded, balance an overload to the first network included in cells neighboring a serving cell.

In accordance with another aspect of the present disclosure, a method for balancing a load in a base station of a communication system having a network sharing architecture capable of serving at least one mobile terminal via at least two PLMNs is provided. The method includes calculating respective loads of the PLMNs, and when a first network of the PLMNs is overloaded, balancing an overload to the first network included in cells neighboring a serving cell.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and/or other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various embodiments of the present disclosure provide a method and an apparatus for exchanging cell load information for each Public Land Mobile Network (PLMN), calculating a load for each PLMN, and performing a load balancing process by taking into consideration the load for each PLMN in a communication system of a network sharing architecture such as an Multi-Operator Core Network (MOCN).

Figure 1A:
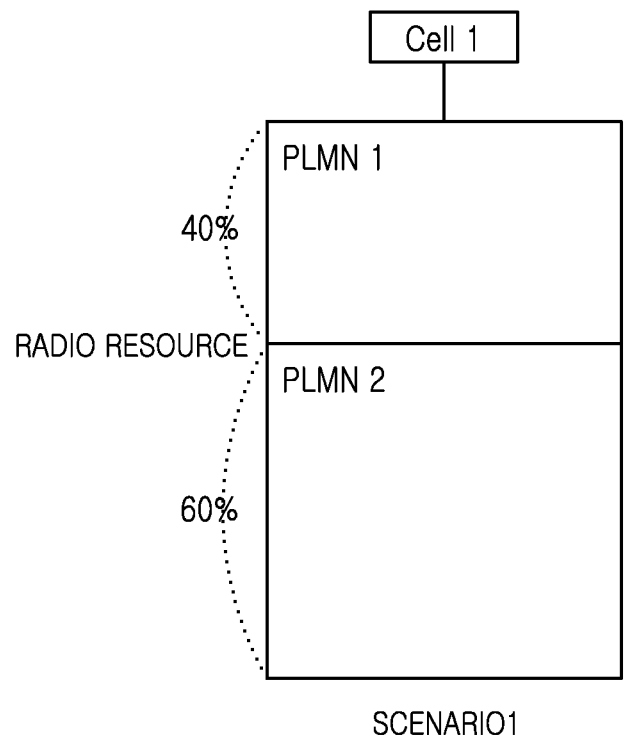
FIGS. 1A, 1B, and 1C are views illustrating scenarios for distributing radio resources in an Multi-Operator Core Network (MOCN) according to various embodiments of the present disclosure.
Figure 1B:
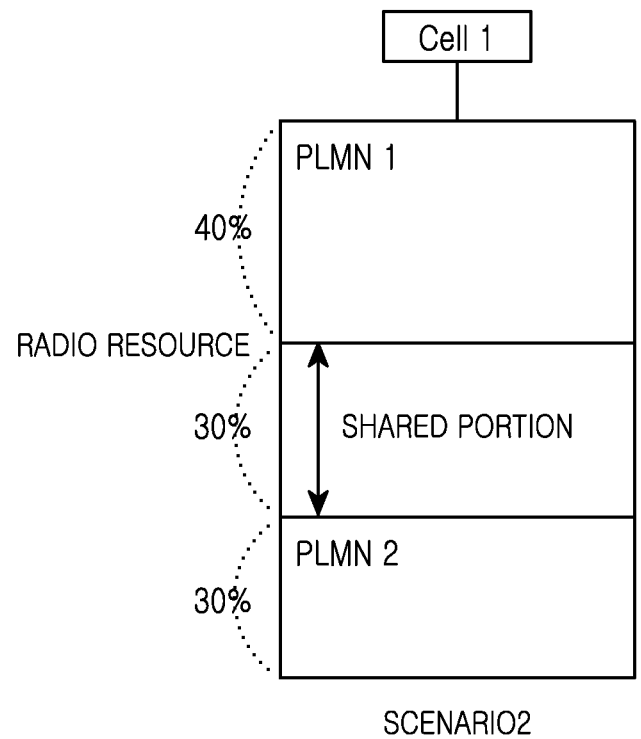
Figure 1C:
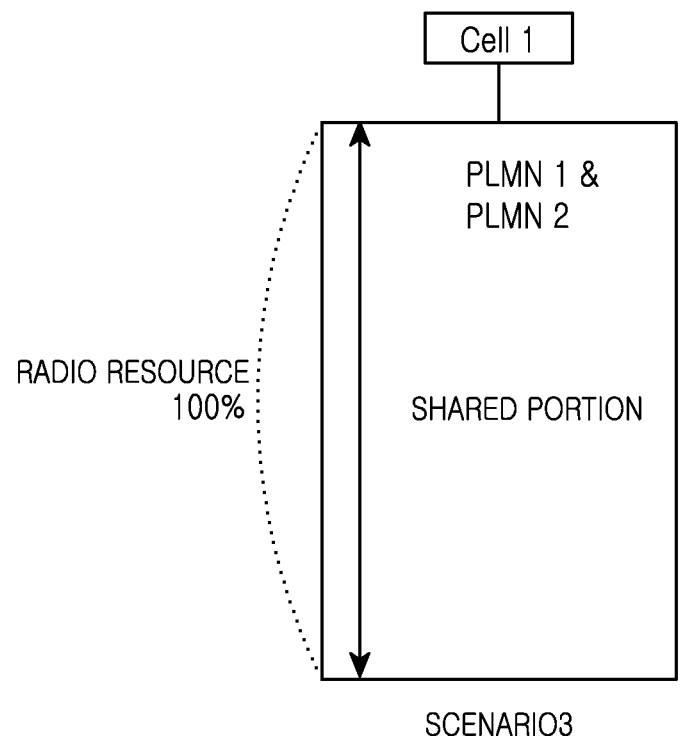

FIGS. 1A to 1C are views illustrating scenarios for distributing radio resources in an MOCN to which various embodiments of the present disclosure are applied according to an embodiment of the present disclosure. Though these scenarios assume two PLMNs exist with respect to each cell, the number of PLMNs is not limited to two PLMNs.

Referring to FIG. 1A, the MOCN distributes absolutely guaranteed radio resources for each PLMN according to a first scenario. 40% of radio resources among the whole radio resources are distributed for a PLMN1, and 60% of radio resources among the whole radio resources are distributed for a PLMN2.

Referring to FIG. 1B, the MOCN distributes partially guaranteed radio resources for each PLMN according to a second scenario. 40% of radio resources among the whole radio resources are distributed for the PLMN1, 30% of radio resources among the whole radio resources are distributed for the PLMN2, and the rest 30% of radio resources are distributed as a shared portion.

Referring to FIG. 1C, the MOCN distributes fully shared radio resources for all PLMNs according to a third scenario. The whole radio resources are distributed as a shared portion of the PLMN1 and PLMN2.

Figure 2:
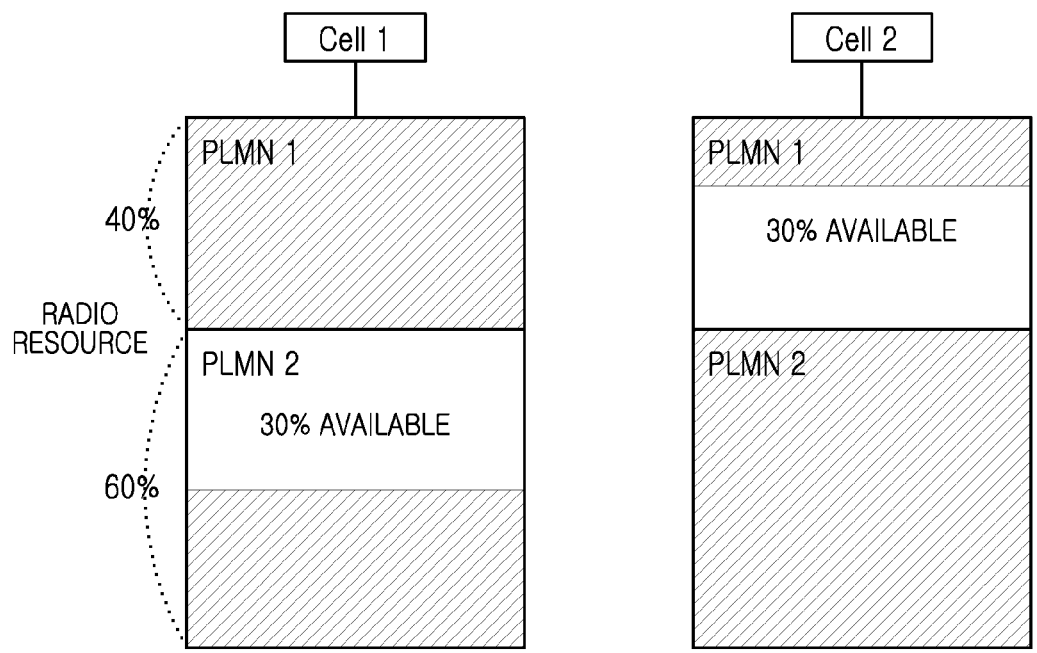
FIG. 2 is a view illustrating unbalance of a load for each Public Land Mobile Network (PLMN) which occurs in a communication system of a network sharing architecture sharing an Radio Access Network (RAN) according to an embodiment of the present disclosure.
Figure 3:
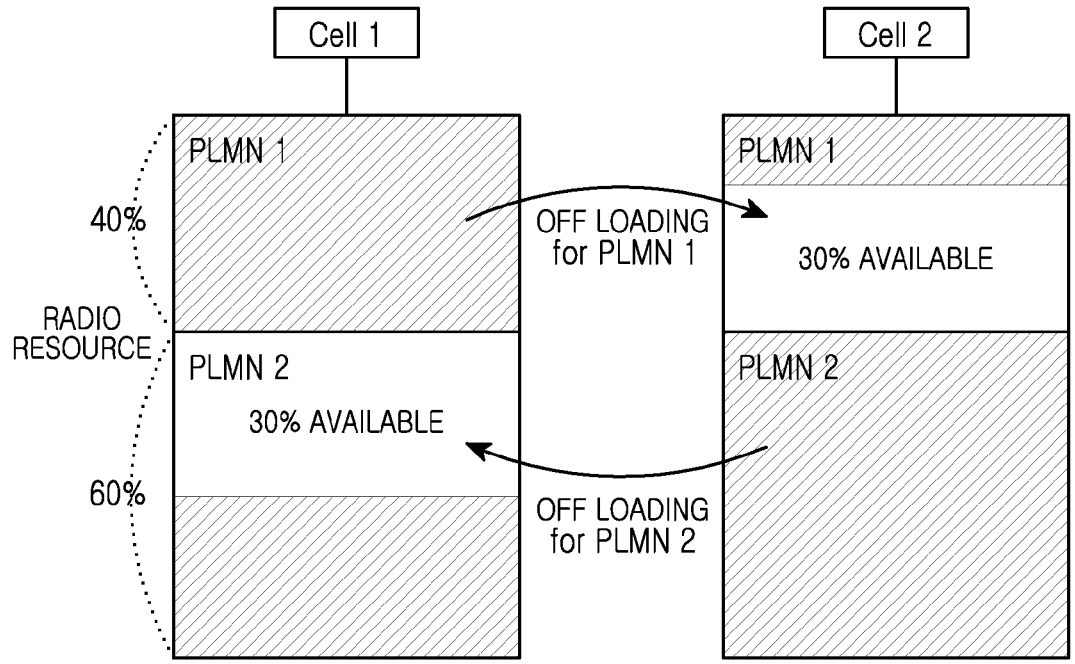
FIG. 3 is a view illustrating a principle of a PLMN-based load balancing operation according to an embodiment of the present disclosure.
Figure 4:
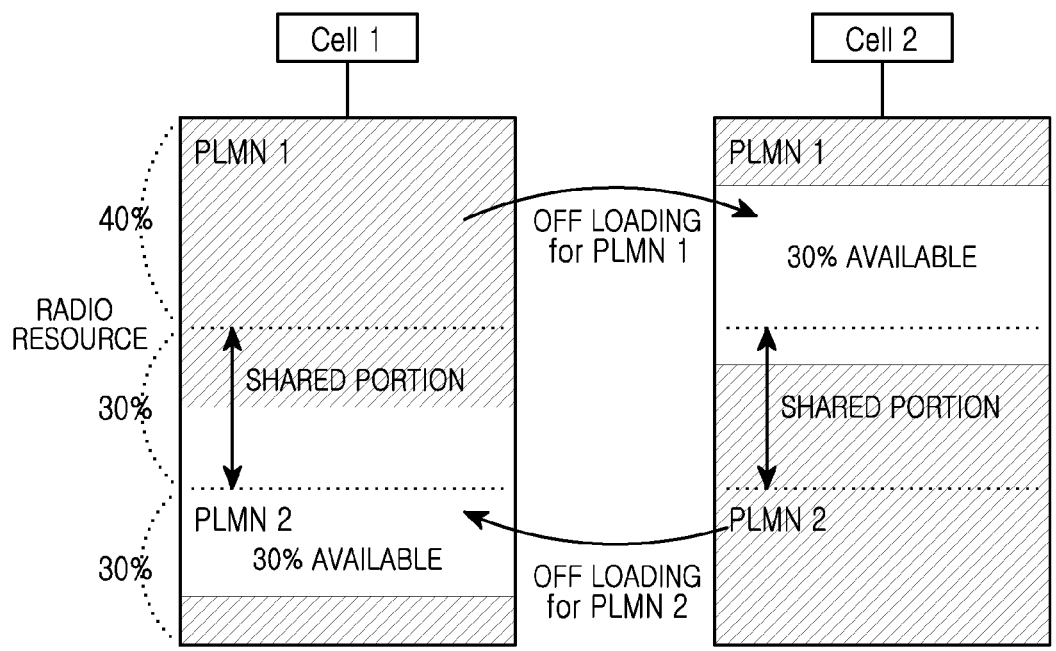
FIG. 4 is a view illustrating a principle of a PLMN-based load balancing operation according to another embodiment of the present disclosure.

FIGS. 2 to 4 are views illustrating a principle of the present disclosure balancing a load by taking into consideration a load for each PLMN in a communication system sharing a Radio Access Network (RAN) according to an embodiment of the present disclosure.

FIG. 2 is a view illustrating unbalance of a load for each Public Land Mobile Network (PLMN) which occurs in a communication system of a network sharing architecture sharing an Radio Access Network (RAN) according to an embodiment of the present disclosure.

Referring to FIG. 2, an example where a load imbalance occurs for each PLMN in the case where radio resources are distributed according to the first scenario illustrated in FIG. 1A is illustrated. All of 40% of distributed radio resources are used for a PLMN1 of a cell 1, while only 10% among distributed radio resources 40% are used for a PLMN1 of a cell 2, and the rest 30% is available for the PLMN1 of the cell 2. All of 60% of distributed radio resources are used for a PLMN2 of the cell 2, while only 30% among distributed radio resources 60% are used for a PLMN2 of the cell 1, and the rest 30% is available for the PLMN2 of the cell 1. Under this circumstance, since the PLMN1 of the cell 1 is in an overload state although the whole network is not in an overload state, User Equipments (UEs) of the PLMN 1 experience deteriorated Quality of Service (QoS) in the cell 1. Furthermore, even when new UE requests the PLMN1 of the cell 1 for a service under this circumstance, the service request is not allowed. The same problem occurs in the PLMN2 of the cell 2. As described above, each of the two cells use 70% of radio resources, and thus an imbalance of a load occurs in each PLMN.

Even when the imbalance problem of a load occurs, the 3rd Generation Partnership Project (3GPP) standard cannot solve this problem. According to the 3GPP standard, cell-based load information is exchanged between neighbor cells, and the cell 1 and the cell 2 have the same load state. Also, load balancing between the cell 1 and the cell 2 is not triggered. Therefore, to solve the imbalance problem of a load described with reference to FIG. 2, a PLMN-based load balancing method needs to be proposed.

FIG. 3 is a view illustrating a principle of a PLMN-based load balancing operation according to an embodiment of the present disclosure.

More particularly, FIG. 3 is a view illustrating the principle of the PLMN-based load balancing operation for resolving load imbalance that may occur under the scenario 1 illustrated in FIG. 1A. Since the PLMN1 of the cell 1 is in an overload state that uses all radio resources allocated to the PLMN1, the PLMN1 offloads a portion of the load of the PLMN1 of the cell 1 to allow the PLMN1 of the cell 2 to bear the offloaded portion. Since the PLMN2 of the cell 2 is in an overload state that uses all radio resources allocated to the PLMN2, the PLMN2 offloads a portion of the load of the PLMN2 to allow the PLMN2 of the cell 1 to bear the offloaded portion.

FIG. 4 is a view illustrating a principle of a PLMN-based load balancing operation according to another embodiment of the present disclosure.

More particularly, FIG. 4 is a view illustrating a principle of the PLMN-based load balancing operation for resolving load imbalance that may occur under the scenario 2 illustrated in FIG. 1B. Since the PLMN1 of the cell 1 is in an overload state that uses all radio resources allocated to the PLMN1, the PLMN1 offloads a portion of the load of the PLMN1 of the cell 1 to the PLMN1 of the cell 2 and/or to a shared portion of the cell 1 and/or cell 2 to bear the offloaded portion.

Figure 5:
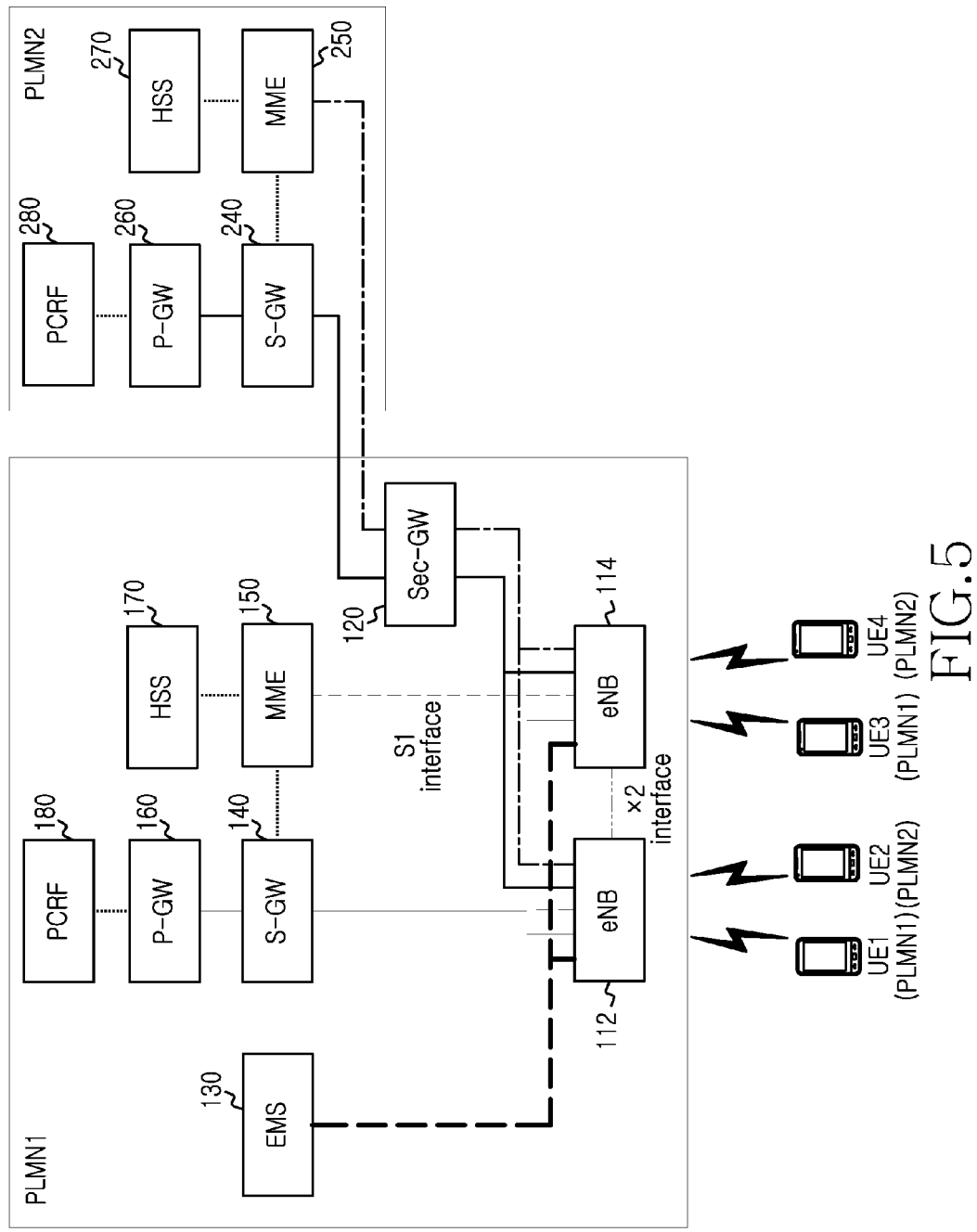
FIG. 5 is a view illustrating an example of the construction of a communication system according to various embodiments of the present disclosure.

FIG. 5 is a view illustrating an example of the construction of a communication system according to various embodiments of the present disclosure. A PLMN1 includes Base Stations (BS) UTRAN Node-Bs (eNBs) 112 and 114, Sec-GW 120, EMS 130, S-GW 140, MME 150, P-GW 160, HSS 170, and PCRF 180. A PLMN2 includes S-GW 240, MME 250, P-GW 260, HSS 270, and PCRF 280. UE1 for the PLMN1 and UE2 for the PLMN2 access the eNB 112. UE3 for the PLMN1 and UE4 for the PLMN2 access the eNB 114. This exemplary construction is applicable to load balancing between the eNBs 112 and 114 used for RAN sharing. For example, the eNB 112 or 114 is an eNB apparatus of a communication system having a network sharing architecture, capable of serving one mobile terminal via at least two PLMNs (PLMN1 and PLMN2).

Figure 6:
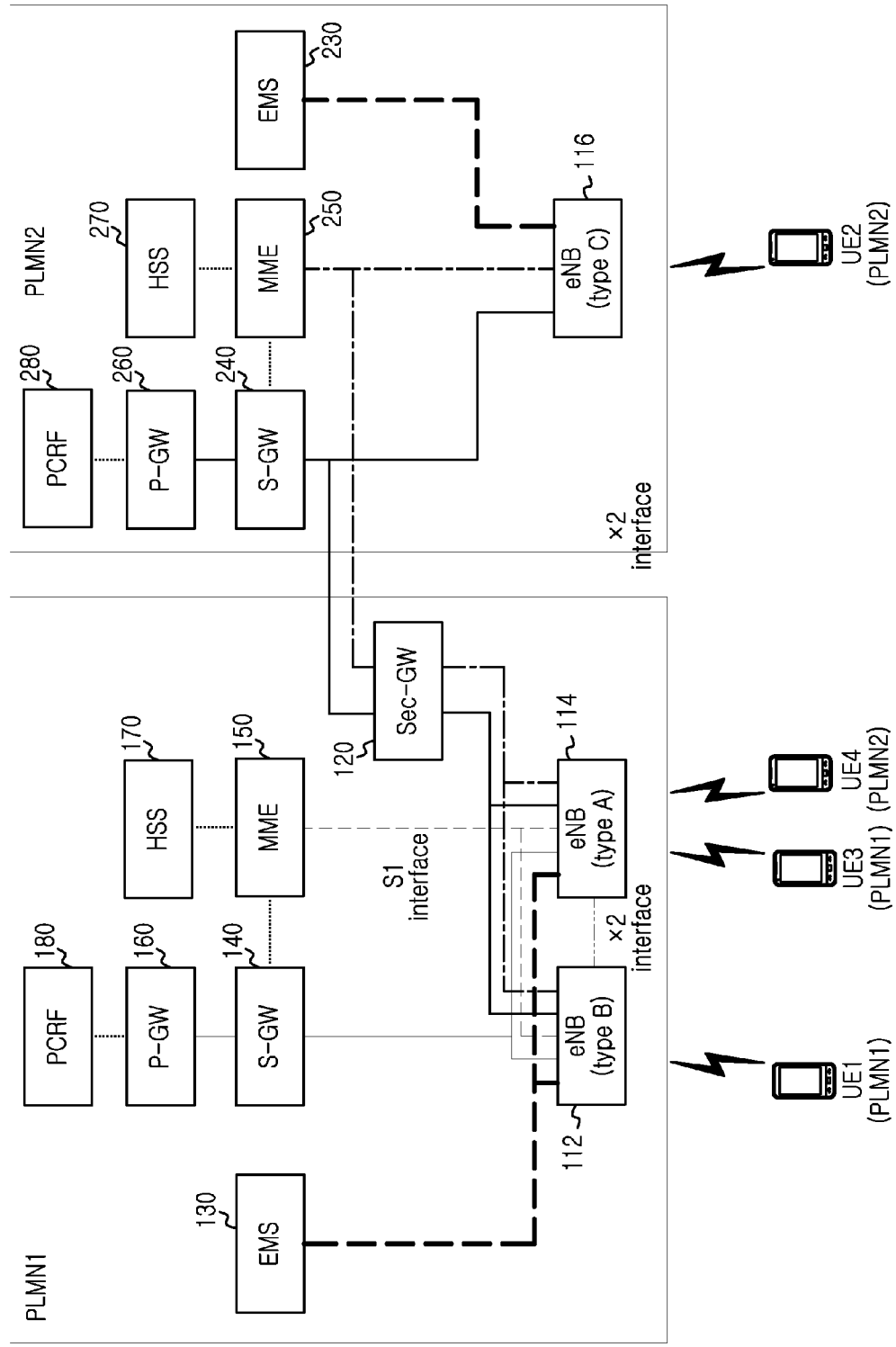
FIG. 6 is a view illustrating another example of the construction of a communication system according to various embodiments of the present disclosure.

FIG. 6 is a view illustrating another example of the construction of a communication system according to various embodiments of the present disclosure. A PLMN1 includes an eNB (type B) 112, an eNB (type A) 114, Sec-GW 120, EMS 130, S-GW 140, MME 150, P-GW 160, HSS 170, and PCRF 180. A PLMN2 includes a BS (type C) 116, EMS 230, S-GW 240, MME 250, P-GW 260, HSS 270, and PCRF 280. UE1 for the PLMN1 accesses the eNB 112. UE3 for the PLMN1 and UE4 for the PLMN2 access the eNB 114. This exemplary construction represents a case where the PLMN1 owns the eNB (type A) 114 for RAN sharing and a dedicated eNB (type B) 112 for the PLMN1, and the PLMN2 uses a dedicated eNB (type C) 116 for the PLMN2 and the eNB (type A) 114 for RAN sharing owned by the PLMN 1. This construction is applicable to load balancing between eNBs of the type A. In case of the PLMN1, this construction is applicable to load balancing between the eNB 114 of the type A and the eNB 112 of the type B. In case of the PLMN2, this construction is applicable to load balancing between the eNB 114 of the type A and the eNB 116 of the type C. For example, the eNB 114 is an eNB apparatus of a communication system having a network sharing architecture, capable of serving one mobile terminal via at least two PLMNs (PLMN1 and PLMN2).

Referring to FIGS. 5 and 6, a system including a plurality of evolved eNBs and an Evolved Packet Core (EPC) is a subnet of a Packet Data Network (PDN) and provides a function of accessing an external network to UE. The EPC includes an MME and an S-GW/P-GW. UEs denote user equipments. The eNBs 112, 114, 116 access UE wirelessly to process a packet call. An eNB performs a transmission/reception function of an RF signal, a modulation/demodulation function of packet traffic, a radio resource control function, etc.

The Security Gateway (Sec-GW) 120 is a gateway for relaying communication between a trusted host of an internal network and a non-trusted host of an external network, and provides a security service to the internal network.

The Mobility Management Entities (MMES) 150 and 250 process a control message via a Non Access Stratum (NAS) signaling protocol with an eNB, and take charge of mobility management of UE, tracking area list management, bearer and session management, etc.

The Serving Gateways (S-GWs) 140 and 240 perform an anchor role of a user plane between a 2G/3G access system and a Long Term Evolution (LTE) system, and manage and change a packet transmission layer of downlink/uplink data.

The Packet Data Network (PDN) Gateways (P-GWs) 160 and 260 allocate an IP address to UE, perform an anchor role for mobility between an LTE system and a non-3GPP access system, and manage billing and a transmission rate depending on a service level.

The Element Management System (EMSs) 130 and 230 provide an interface of an operator matching function so that the operator may perform an operation and maintenance on an eNB, and provide software management, configuration management, performance management, and a disorder management function.

The Home Subscriber Servers (HSSs) 170 and 270 are database management systems for storing and managing parameter and position information of all mobile subscribers. The HSS manages important data such as an access capability, a basic service, an additional service of a mobile subscriber, etc., and performs a routing function on a called subscriber.

The Policy Charging & Rule Functions (PCRF) 180 and 280 generate a policy rule for dynamically applying differentiated QoS and billing policy for each service flow, or generate a policy rule applicable to a plurality of service flows in common.

As described above, an embodiment of the present disclosure relates to an alternative for transferring cell load information for each PLMN, calculating a load for PLMN, and performing a load balancing process by taking into consideration a load for each PLMN in a communication system such as an MOCN sharing an RAN.

First, an operation for transferring cell load information for each PLMN according to various embodiments of the present disclosure is described with reference to FIGS. 7A to 8B. According to the various embodiments of the present disclosure, cell load information for each PLMN and information regarding resource allocation ratio for each PLMN of a relevant cell are exchanged. The cell load information for each PLMN includes Radio Resources Status IE, and Composite Available Capacity Group IE. S1 TNL Load Indicator IE may be selectively included in cell load information for each PLMN.

Figure 7A:
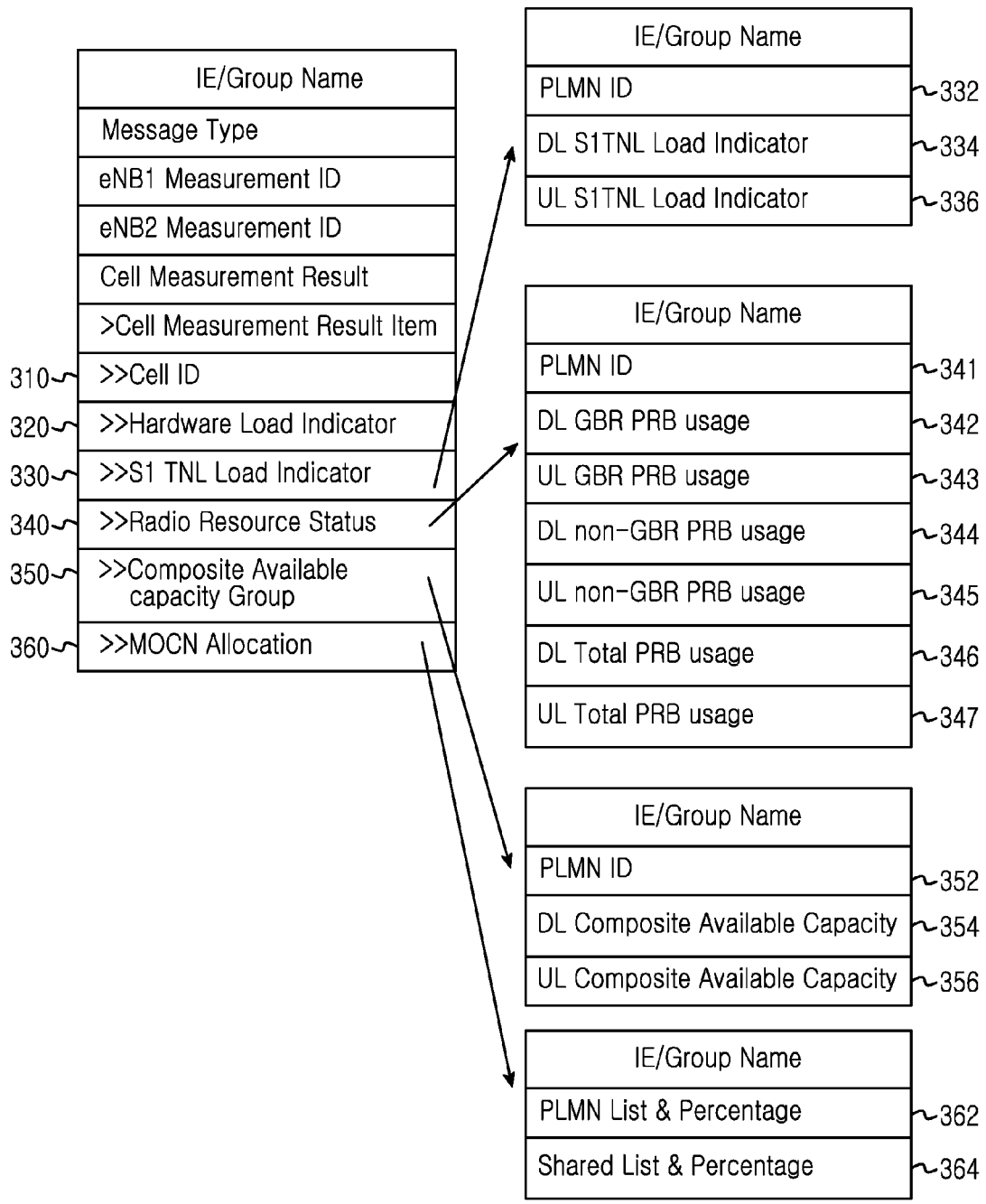
FIGS. 7A to 8B are views illustrating cell load information according to various embodiment of the present disclosure.

FIG. 7A is a view illustrating cell load information according to an embodiment of the present disclosure.

Referring to FIG. 7A, Information Element (IE) of cell load information according to an embodiment of the present disclosure includes Message Type, eNB 1 Measurement ID, eNB2 Measurement ID, and Cell Measurement Result. Cell Measurement Result Item includes a cell ID 310, a hardware load indicator 320, an S1 TNL load indicator 330, a radio resources status 340, a composite available capacity group 350, and an MOCN allocation 360.

The hardware load indicator 320, the S1 TNL load indicator 330, the radio resources status 340, and the composite available capacity group 350 of the Cell Measurement Result item are cell load items over X2 defined by 3GPP standard TS 36.423 Re1.9. Content of items defined by the standard is described in Table 1 below.

TABLE 1

| Items | Description |
|---|---|
| Hardware Load Indicator | UL/DL HW load: low, mid, high, overload |
| S1 TNL Load Indicator | UL/DL TNL load: low, mid, high, overload |
| Radio Resources Status | UL/DL GBR PRB usage, UL/DL non-GBR |

TABLE 1-continued

| Items | Description |
| --- | --- |
| Composite Available Capacity Group | PRB usage, UL/DL total PRB usage Cell Capacity Class value (UL/DL relative capacity indicator) Capacity value (UL/DL available capacity for load balancing as percentage of total cell capacity) |

As described in Table 1, an HW load and an S1 TNL load are defined as low, medium, high, and overload depending on a rate of use. The Radio resource status displays a Physical Resource Block (PRB) use rate for a Guaranteed Bit Rate (GBR) service, a PRB use rate for a non-GBR service, and an entire PRB use rate in terms of percentage. The Cell capacity class value represents a relative entire capacity of a cell. For example, in the case where a 10 MHz-cell and a 5 MHz-cell exist on a business network, when the 10 MHz-cell is 100%, the 5 MHz-cell may be set to have a cell capacity class value of 50%. Assuming that an entire capacity for traffic of a cell is 100%, a capacity value represents an acceptance capability of a current cell in terms of percentage. This value may be defined and used by every vendor.

Referring to FIG. 7A again, when compared to a standard-based Resource Status Update message, cell load information according to the embodiment of the present disclosure further includes the MOCN Allocation IE 360, and a PLMN ID may be added to each IE. Specifically, S1 TNL Load Indicator 330, Radio Resources Status 340 and Composite Available Capacity Group 350 further include a PLMN ID 332, 341 and 352, respectively. Generally, an S1 TNL load is not discriminated for each PLMN but has a common value, but in the case where an amount of use for S1 TNL is limited for each PLMN, S1 TNL load information for each PLMN may be displayed. That is, as illustrated, S1 TNL Load Indicator 330 may further include PLMN ID 332 as well as DL S1 TNL Load Indicator 334 and UL S1 TNL Load Indicator 336. Radio Resources Status 340 may include DL GBR PRB usage 342, UL GBR PRB usage 343, DL non-GBR PRB usage 344, UL non-GBR PRB usage 345, DL Total PRB usage 346 and UL Total PRB usage 347, and may further include PLMN ID 341. Composite Available Capacity Group 350 may include DL Composite Available Capacity 354 and UL Composite Available Capacity 356, and may further include PLMN ID 352. The HW Load Indicator 320 is not discriminated for each PLMN but has a common value.

The MOCN Allocation IE 360 includes PLMN List & Percentage IE 362 and Shared List & Percentage IE 364. The PLMN List & Percentage IE 362 expresses an amount of radio resources used by each PLMN in terms of percentage. In the case where a shared resource exists, the Shared List & Percentage IE 364 expresses an amount of radio resources thereof in terms of percentage.

Figure 7B:
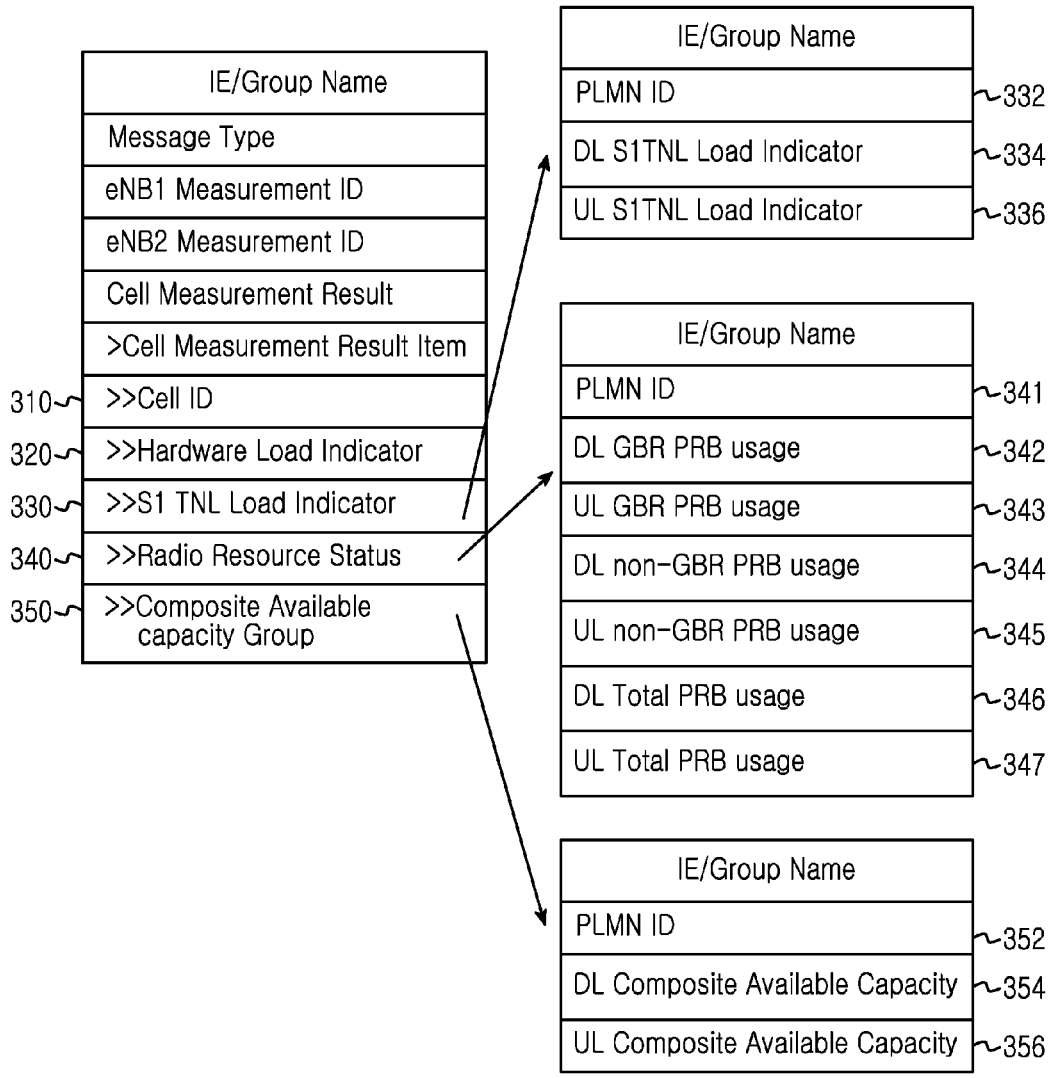

FIG. 7B is a view illustrating cell load information according to another embodiment of the present disclosure.

Referring to FIG. 7B, Information Element (IE) of cell load information according to an embodiment of the present disclosure includes Message Type, eNB1 Measurement ID, eNB2 Measurement ID, and Cell Measurement Result. Cell Measurement Result Item includes a cell ID 310, a hardware load indicator 320, an S1 TNL load indicator 330, a radio resources status 340, and a composite available capacity group 350. When compared to Cell Measurement Result Item shown in FIG. 7A, Cell Measurement Result Item of FIG. 7B does not include the MOCN Allocation IE 360. Herein, the MOCN Allocation IE 360 as information regarding resource allocation ratio for each PLMN is transferred as a message including information regarding a serving cell, which is separated from the cell load information, to neighbor eNBs.

Figure 8A:
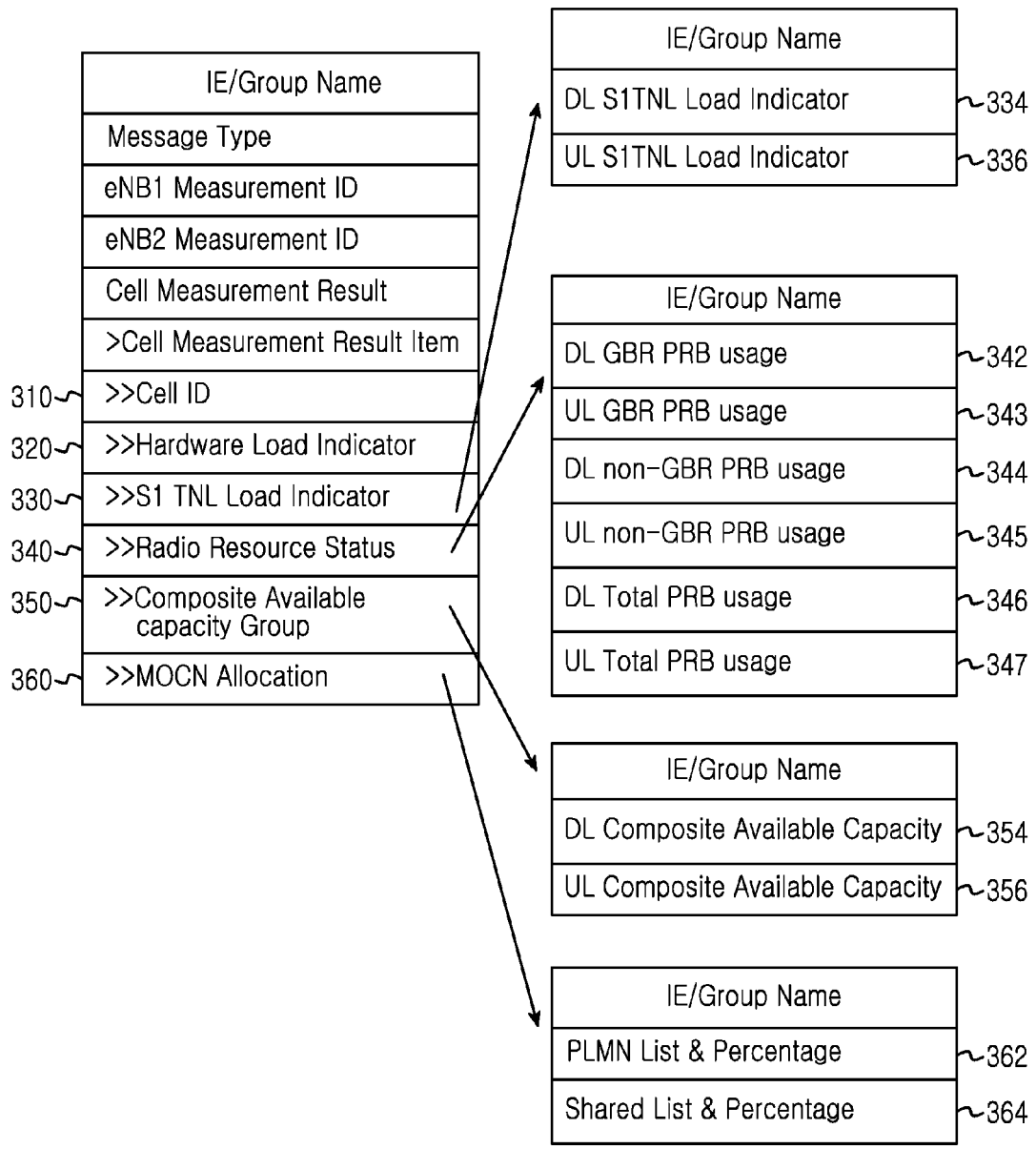

FIG. 8A is a view illustrating cell load information according to another embodiment of the present disclosure.

Referring to FIG. 8A, an IE of cell load information according to another embodiment of the present disclosure includes Message Type, eNB1 Measurement ID, eNB2 Measurement ID, and Cell Measurement Result. The cell Measurement Result Item includes a Cell ID 310, a Hardware Load Indicator 320, an S1 TNL Load Indicator 330, a Radio Resources Status 340, a Composite Available Capacity Group 350, an MOCN Allocation 360, and PLMN ID 370.

When compared to FIG. 7A, Cell load information according to this embodiment includes the MOCN Allocation IE 360, and unlike FIG. 7A, the PLMN ID IE 370 is not included as an internal IE of each IE (ex: the Radio Resources Status 340, the Composite Available Capacity Group 350, and selectively the S1 TNL Load Indicator 330), but included as a separate IE corresponding to each IE. Since the functions of them are the same, description thereof is omitted.

Figure 8B:
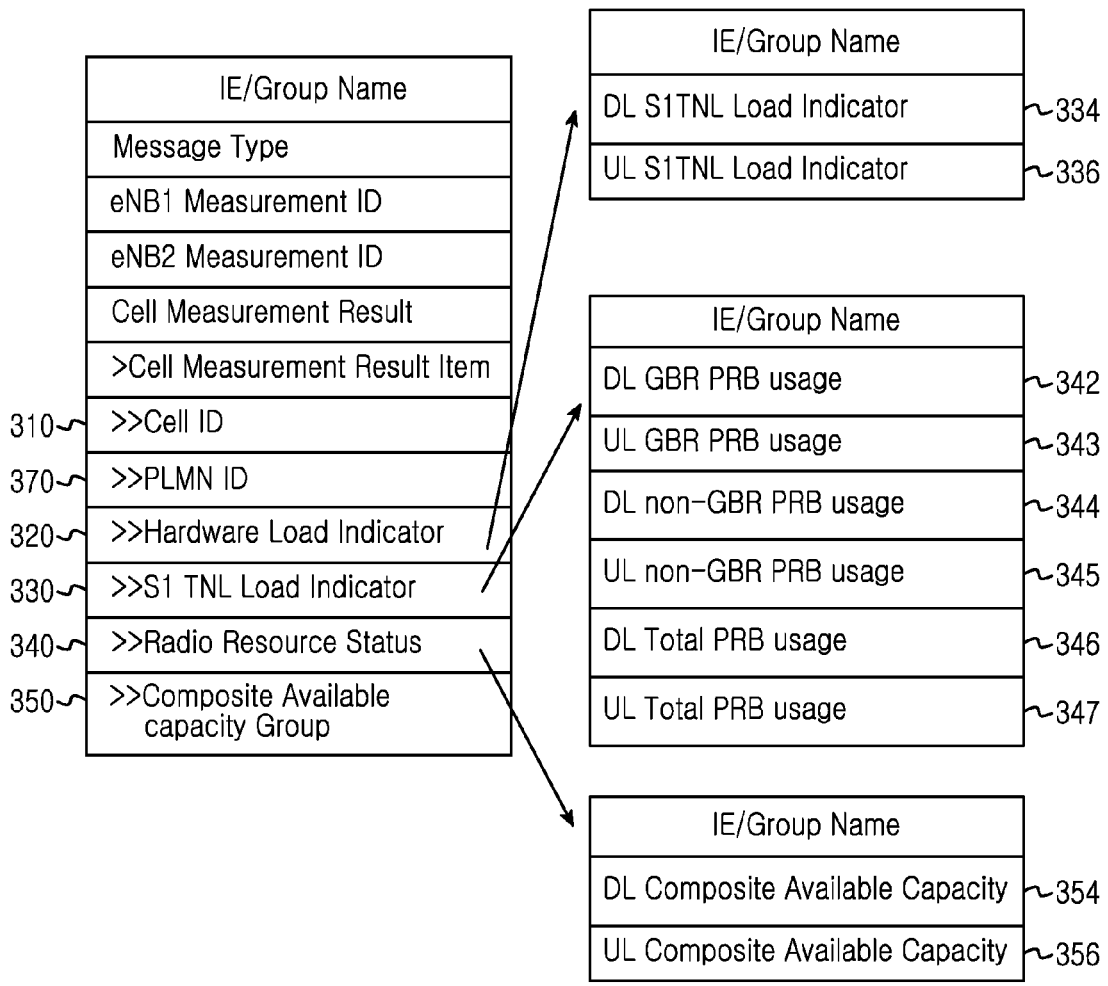

FIG. 8B is a view illustrating cell load information according to another embodiment of the present disclosure.

Referring to FIG. 8B, an IE of cell load information according to another embodiment of the present disclosure includes Message Type, eNB1 Measurement ID, eNB2 Measurement ID, and Cell Measurement Result. The cell Measurement Result Item includes a Cell ID 310, a Hardware Load Indicator 320, an S1 TNL Load Indicator 330, a Radio Resources Status 340, a Composite Available Capacity Group 350, and PLMN ID 370.

When compared to FIG. 8A, Cell load information according to this embodiment does not include the MOCN Allocation IE 360, and unlike FIG. 7B, the PLMN ID IE 370 is not included as an internal IE of each IE (ex: the Radio Resources Status 340, the Composite Available Capacity Group 350, and selectively the S1 TNL Load Indicator 330), but included as a separate IE corresponding to each IE. Herein, the MOCN Allocation IE 360 as information regarding resource allocation ratio for each PLMN is transferred as a message including information regarding a serving cell, which is separated from the cell load information, to neighbor eNBs.

Since the functions of them are the same, description thereof is omitted.

Next, an apparatus and a process flow for a load balancing operation according to various embodiments of the present disclosure are described with reference to FIGS. 9 and 10.

Figure 9:
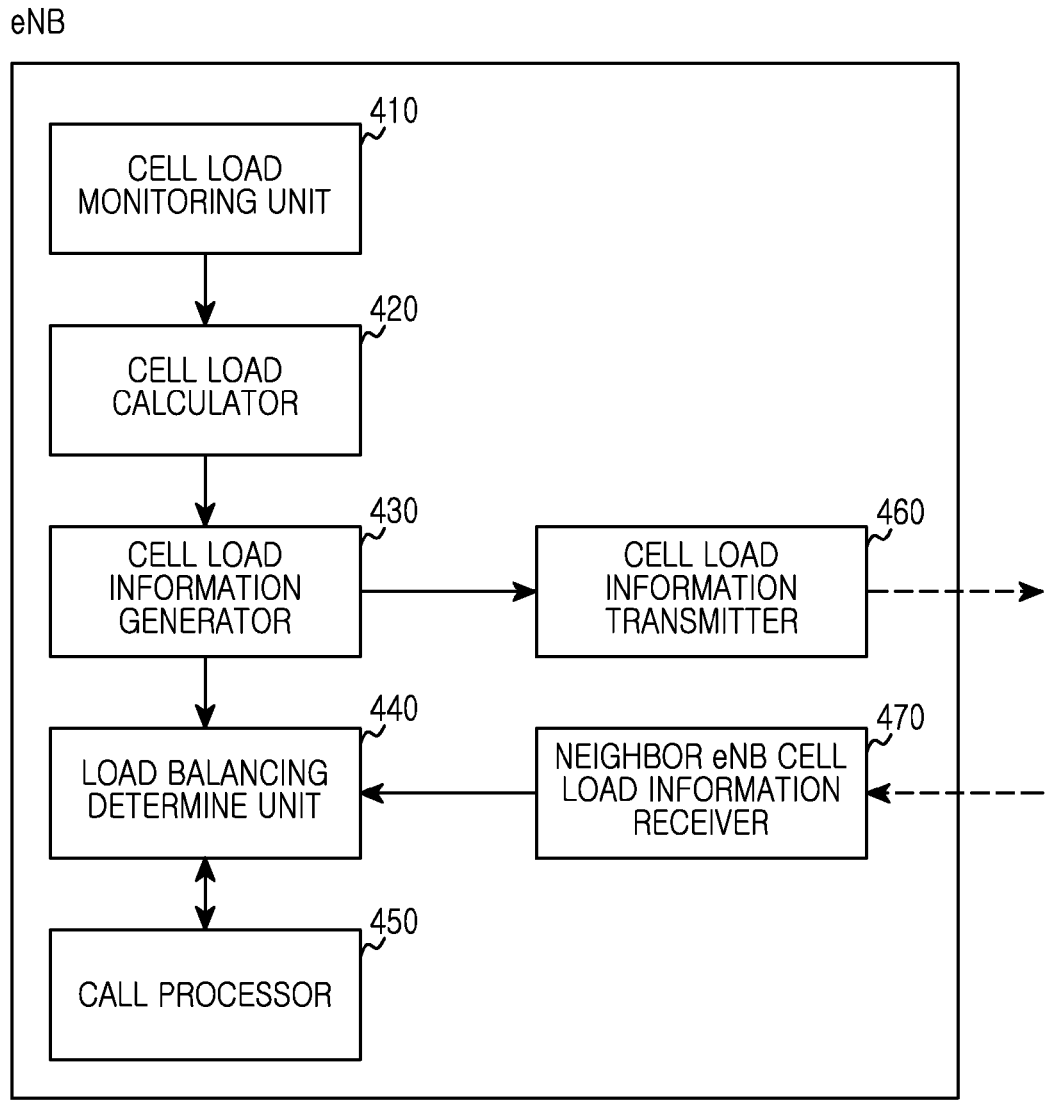
FIG. 9 is a block diagram illustrating the construction of an UTRAN Node-Bs (eNB) apparatus for a load balancing operation according to various embodiments of the present disclosure.

FIG. 9 is a block diagram illustrating the construction of an eNB apparatus for a load balancing operation according to various embodiments of the present disclosure. The apparatus includes a cell load monitoring unit 410, a cell load calculator 420, a cell load information generator 430, a load balancing determine unit 440, a call processor 450, a cell load information transmitter 460, and a neighbor eNB cell load information receiver 470.

The cell load monitoring unit 410 measures a cell load periodically. A measured cell load includes a HardWare (HW) load such as a CPU use rate, an S1 TNL load such as a backhaul use rate, and a PRB use rate for each PLMN. These loads are measured periodically.

The cell load calculator 420 calculates a cell load for each PLMN. Generally, an HW load, an S1 TNL load, etc. are not discriminated for each PLMN, so that a common load on a cell basis is used. However, a load is managed for each PLMN so that a cell that has received this information may use only required cell load information for each PLMN. The cell load calculator 420 calculates a cell capacity value for each PLMN and a cell load for each PLMN based on a PRB use rate for each PLMN and an HW load, and an S1 TNL load. This cell load calculation operation for each PLMN is described in more detail with reference to FIGS. 11 and 12.

The cell load information generator 430 generates and stores periodically calculated cell load information for each PLMN, and transfers this information to the cell load information transmitter 460 and the load balancing determine unit 440. Transferred cell load information for each PLMN is shown in Table 1. An HW load indicator and an S1 TNL load indicator display a relevant cell load in terms of low, mid, high, and overload. A value of a Radio resource status, a Cell Capacity Class value of a Composite available capacity group, and a Capacity value are displayed in terms of percentage.

The cell load information transmitter 460 transmits information of the form illustrated in FIG. 7A, FIG. 7B, FIG. 8A or FIG. 8B to neighbor (abutting) eNBs that have requested cell load information. That is, the cell load information transmitter 460 transmits information regarding a resource allocation ratio of a cell for each PLMN, and cell load information for each PLMN. As illustrated in FIGS. 7 and 8, the information regarding the resource allocation ratio of the cell for each PLMN includes the PLMN List & Percentage IE 362 and the Shared List & Percentage 364 included in the MOCN Allocation IE 360. Cell load information for each PLMN includes the Hardware Load Indicator 320, the S1 TNL Load Indicator 330, the Radio Resources Status 340, and the Composite Available Capacity Group 350.

The neighbor eNB cell load information receiver 470 receives cell load information of a neighbor eNB.

The load balancing determine unit (or controller) 440 determines whether a load balancing condition is met with respect to a plurality of PLMNs periodically. At this point, the load balancing determine unit 440 may determine whether an overload exists with respect to the plurality of PLMNs by receiving not only a PLMN of itself but also cell load information of a neighbor eNB. Also, when determining load balancing is required, the load balancing determine unit 440 performs an operation for load balancing. The load balancing determine operation for the plurality of PLMNs is described in more detail with reference to FIGS. 13 and 14.

The call processor 450 performs a general call process operation in the inside of an eNB.

Figure 10:
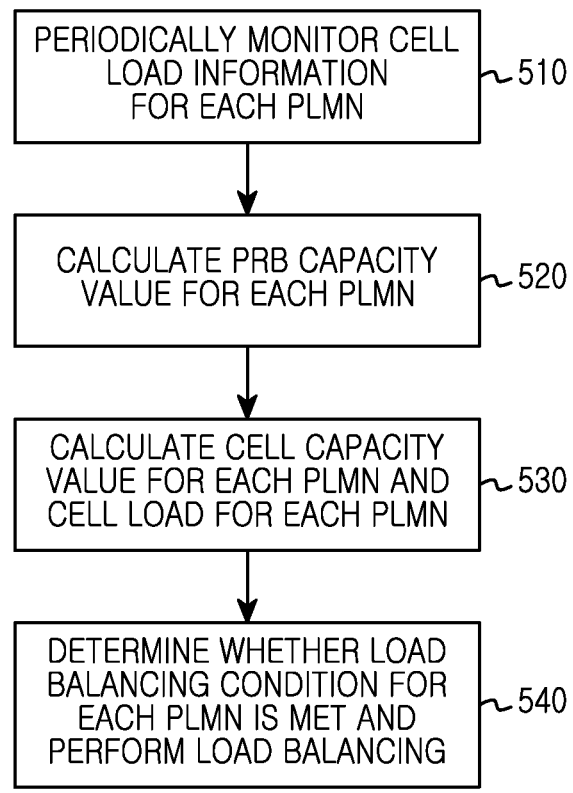
FIG. 10 is a flowchart illustrating a process flow of a load balancing operation according to various embodiments of the present disclosure.

FIG. 10 is a flowchart illustrating a process flow of a load balancing operation according to various embodiments of the present disclosure. This process flow is performed by respective elements of an eNB apparatus illustrated in FIG. 9.

The cell load monitoring unit 410 of FIG. 9 monitors cell load information for each PLMN periodically in operation 510.

The cell load calculator 420 calculates a PRB capacity value for each PLMN in operation 520. The cell load calculator 420 calculates a cell capacity value for each PLMN and a cell load for each PLMN in operation 530. The cell load information calculated in this way is transferred to the load balancing determine unit 440 via the cell load information generator 430.

The load balancing determine unit 440 receives cell load information, determines whether a load balancing condition for each PLMN is met, and performs a load balancing operation depending on the determination result in operation 540.

Next, an operation for calculating a load for each PLMN according to various embodiments of the present disclosure is described.

Figure 11:
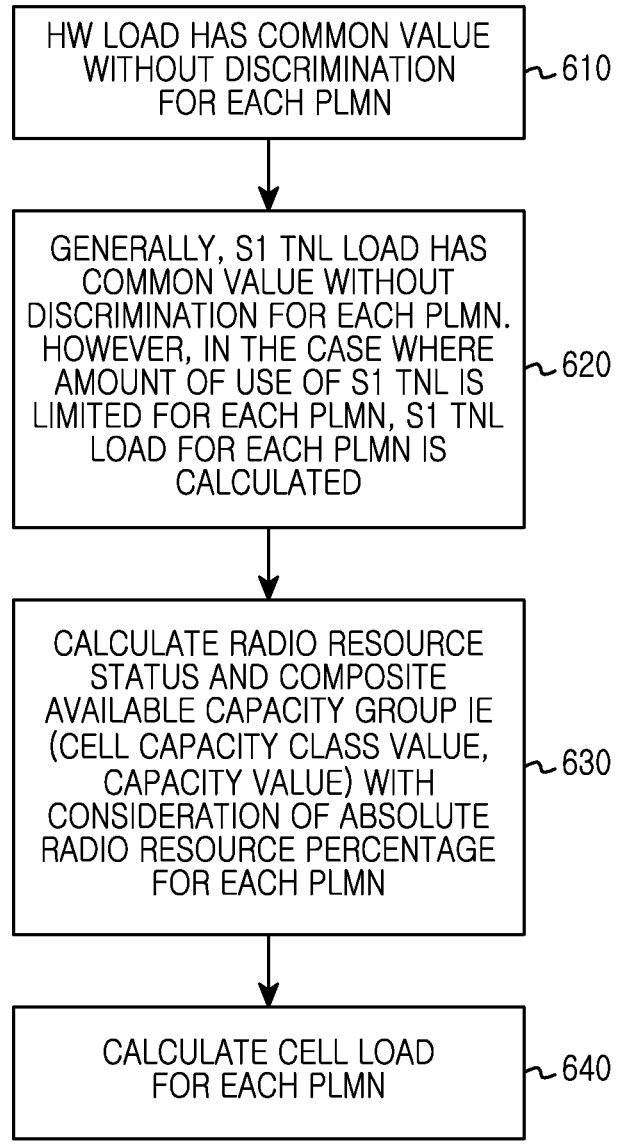
FIG. 11 is a flowchart illustrating a process flow of a cell load calculating operation according to an embodiment of the present disclosure.

FIG. 11 is a flowchart illustrating a process flow of a cell load calculating operation according to an embodiment of the present disclosure. This process flow corresponds to an operation for calculating a cell load by taking into consideration an absolute radio resource portion allocated for each PLMN in the case where radio resources are allocated absolutely for each PLMN as illustrated in FIG. 3. This operation is performed by the cell load calculator 420 illustrated in FIG. 9.

The cell load calculator 420 calculates an HW load in operation 610. The HW load has a common value without discrimination for each PLMN.

The cell load calculator 420 calculates an S1 TNL load for each PLMN in operation 620. Generally, the S1 TNL load has a common value without discrimination for each PLMN. However, in the case where an amount of use of the S1 TNL is limited for each PLMN, the cell load calculator 420 calculates an S1 TNL load for each PLMN.

The cell load calculator 420 calculates a Radio Resource Status and a Composite Available Capacity Group IE (Cell Capacity Class value and Capacity value) by taking into consideration an absolute radio resource percentage for each PLMN in operation 630. Specifically, according to the scenario illustrated in FIG. 3, when calculating Radio Resource Status (GBR/non-GBR/total PRB usage), the cell load calculator 420 calculates Radio Resource Status of PLMN1 of a cell 1 by taking into consideration 40% of a PRB amount as utilizable of an entire PRB. That is, when all 40% of the PRB is used, the total PRB usage of the PLMN1 is 100%.

When calculating a Cell Capacity Class Value, the cell load calculator 420 reflects a radio resource percentage allocated for each PLMN. That is, as in Equation (1) below, the cell load calculator 420 multiplies an existing DL cell capacity value by an absolute radio resource portion for each PLMN. Herein, the radio resource portion may be calculated by the relation of a radio resource percentage/100. DL cell capacity class value in Equation 1 may be calculated by Equation 2. Temporary DL cell capacity class value in Equation 2 may be calculated by Equation 3. UL cell capacity class value for each PLMN may be calculated in the same manner. Also, when calculating a capacity value, the cell load calculator 420 considers a radio resource percentage for each PLMN.

$$(DL \text{ cell capacity class value for } PLMN\,p) = (DL \text{ cell capacity class value}) \times (DL \text{ radio resource portion for } PLMN\,p) \quad \text{Equation (1)}$$

$$(DL \text{ cell capacity class value}) = 100 \times (\text{temporary } DL \text{ cell capacity class value})/(DL \text{ scalling factor}) \quad \text{Equation (2)}$$

$$(\text{Temporary } DL \text{ cell capacity class value}) = (DL \text{ bandwidth}) \times (DL \text{ time portion}) \quad \text{Equation (3)}$$

The cell load calculator 420 calculates a cell load for each PLMN in operation 640. The cell load for each PLMN is calculated as "100-(capacity value for each PLMN)".

Figure 12:
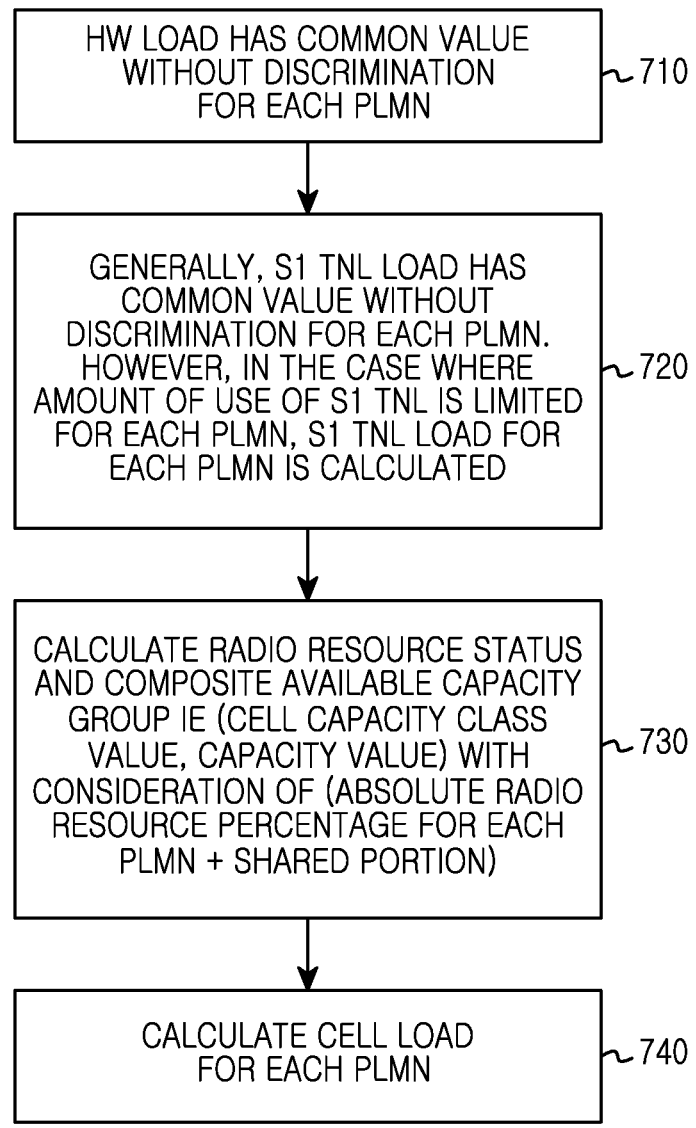
FIG. 12 is a flowchart illustrating a process flow of a cell load calculating operation according to another embodiment of the present disclosure.

FIG. 12 is a flowchart illustrating a process flow of a cell load calculating operation according to another embodiment of the present disclosure. In the case where radio resources are allocated absolutely for each PLMN and a shared portion for PLMNs exists as illustrated in FIG. 4, this process flow corresponds to an operation of calculating a cell load by taking into consideration the absolute radio resource portion allocated for each PLMN. This operation is performed by the cell load calculator 420 illustrated in FIG. 9.

The cell load calculator 420 calculates an HW load in operation 710. The HW load has a common value without discrimination for each PLMN.

The cell load calculator 420 calculates an S1 TNL load for each PLMN in operation 720. Generally, the S1 TNL load has a common value without discrimination for each PLMN.

However, in the case where an amount of use of the S1 TNL is limited for each PLMN, the cell load calculator 420 calculates an S1 TNL load for each PLMN.

The cell load calculator 420 calculates a Radio Resource Status and a Composite Available Capacity Group IE (Cell Capacity Class value and Capacity value) by taking into consideration an absolute radio resource percentage for each PLMN and a shared portion in operation 730. Specifically, according to the scenario illustrated in FIG. 4, when calculating Radio Resource Status (GBR/non-GBR/total PRB usage), the cell load calculator 420 calculates Radio Resource Status of PLMN1 of a cell 1 by taking into consideration that 70%=40%+30% of a PRB amount as utilizable entire PRB. That is, when all 70% of the PRB is used, the total PRB usage of the PLMN1 is 100%.

When calculating a Cell Capacity Class Value, the cell load calculator 420 reflects a radio resource percentage allocated for each PLMN and a shared portion. This is expressed in Equation (4) below. UL cell capacity class value for each PLMN may be calculated in the same manner. Also, when calculating a Capacity value, the cell load calculator 420 considers a radio resource percentage for each PLMN.

$$(DL\text{ cell capacity class value for }PLMN\ p) = (DL\text{ cell capacity class value}) \times \{(DL\text{ radio resource portion for }PLMN\ p) + (DL\text{ shared radio portion})\} \quad \text{Equation (2)}$$

The cell load calculator 420 calculates a cell load for each PLMN in operation 740. The cell load for each PLMN is calculated as "100-(capacity value for each PLMN)".

Last, an operation for performing a load balancing process by taking into consideration a load for each PLMN according to various embodiments of the present disclosure is described.

Figure 13:
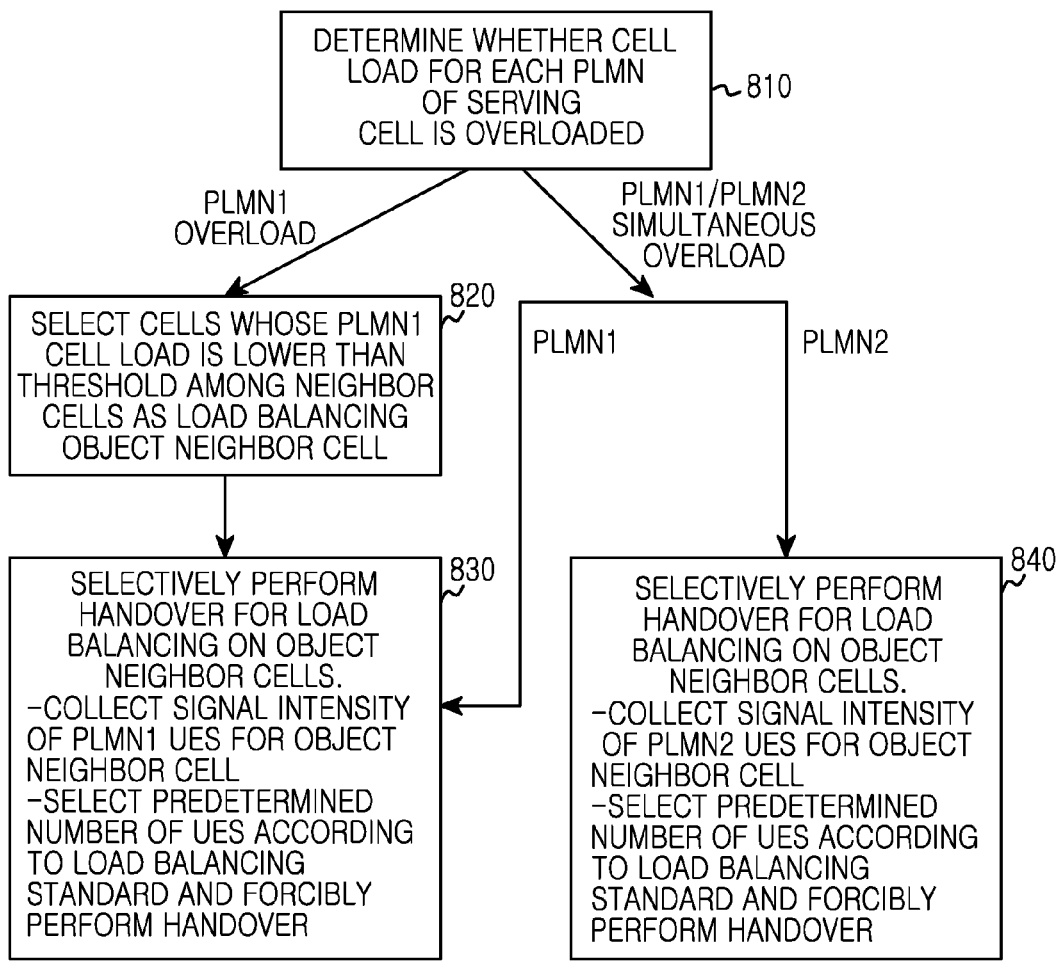
FIG. 13 is a flowchart illustrating a process flow of a load balancing operation according to an embodiment of the present disclosure.

FIG. 13 is a flowchart illustrating a process flow of a load balancing operation according to an embodiment of the present disclosure. This process flow corresponds to an operation for balancing a load in the case where an amount of use of radio resources is absolutely allocated for each PLMN as illustrated in FIG. 3. This operation is periodically performed by the load balancing determine unit 440 illustrated in FIG. 9.

The load balancing determine unit 440 determines whether a cell load for each PLMN of a serving cell is overloaded in operation 810.

For example, when determining the PLMN1 is overloaded, the load balancing determine unit 440 selects cells whose cell load is lower than a threshold among neighbor cells as load balancing object neighbor cells in operation 820.

The load balancing determine unit 440 selectively performs a handover for load balancing on object neighbor cells in operation 830. Various methods for performing a handover for the purpose of load balancing may exist. For example, a method of selecting (a target cell and a target UE), and forcibly performing a handover is considered. According to this method, first, a process of collecting reception signal intensity of PLMN1 UEs for an object neighbor cell is performed. Next, a process for selecting the number of UEs determined according to a load balancing standard and forcibly performing a handover by taking into consideration a load of a candidate neighbor cell and reception signal intensity of a candidate neighbor cell of a candidate PLMN1 UE among various combination objects of (a candidate neighbor cell and a candidate PLMN1 UE) is performed.

For another example, when determining the PLMN1 and PLMN2 are overloaded simultaneously, the load balancing determine unit 440 performs an operation of performing a handover for load balancing independently. That is, the load balancing determine unit 440 proceeds to operation 830 to perform an operation of performing a handover for load balancing on the PLMN1, and proceeds to operation 840 to perform an operation of performing a handover for load balancing on the PLMN2.

The load balancing determine unit 440 selectively performs a handover for load balancing on object neighbor cells in operation 840. Various methods for performing a handover for the purpose of load balancing may exist. For example, a method of selecting (a target cell and a target UE), and forcibly performing a handover is considered. According to this method, first, a process of collecting reception signal intensity of PLMN2 UEs for an object neighbor cell is performed. Next, a process for selecting the number of UEs determined according to a load balancing standard and forcibly performing a handover by taking into consideration a load of a candidate neighbor cell and reception signal intensity of a candidate neighbor cell of a candidate PLMN2 UE among various combination objects of (a candidate neighbor cell and a candidate PLMN2 UE) is performed.

Figure 14:
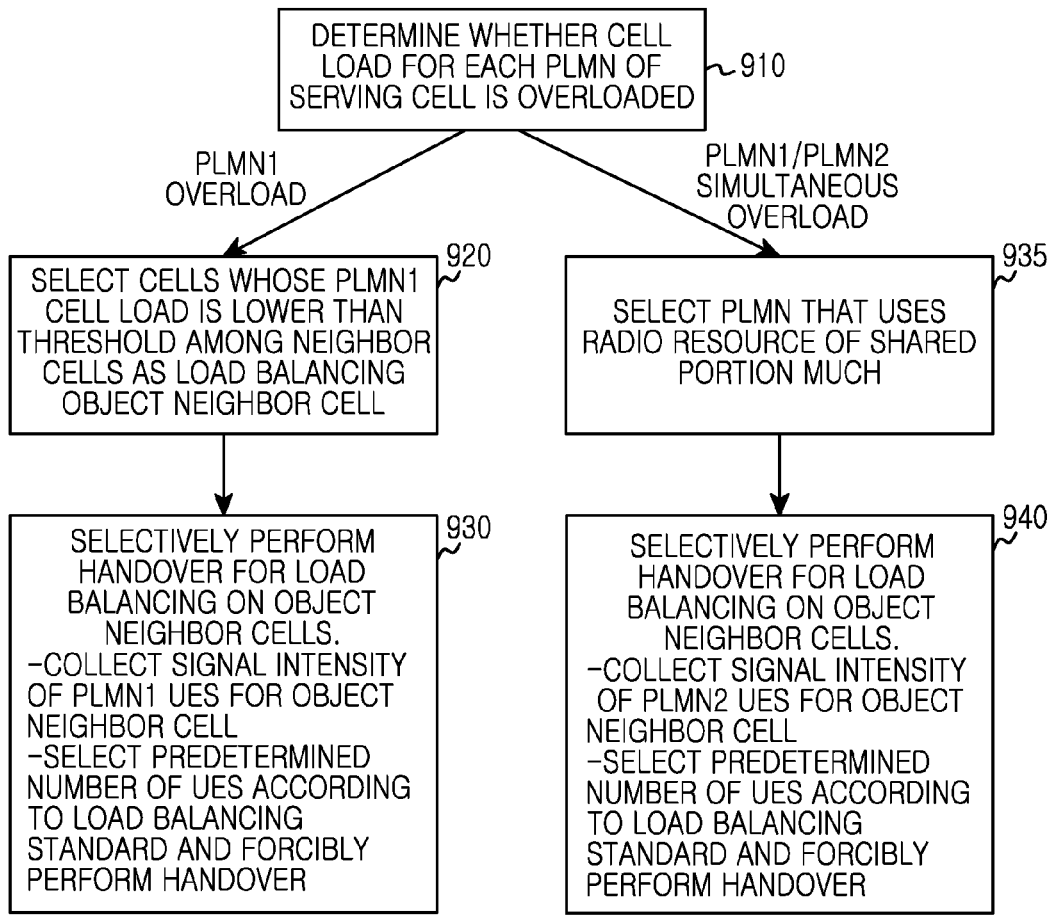
FIG. 14 is a flowchart illustrating a process flow of a load balancing operation according to another embodiment of the present disclosure.
Figure 15:
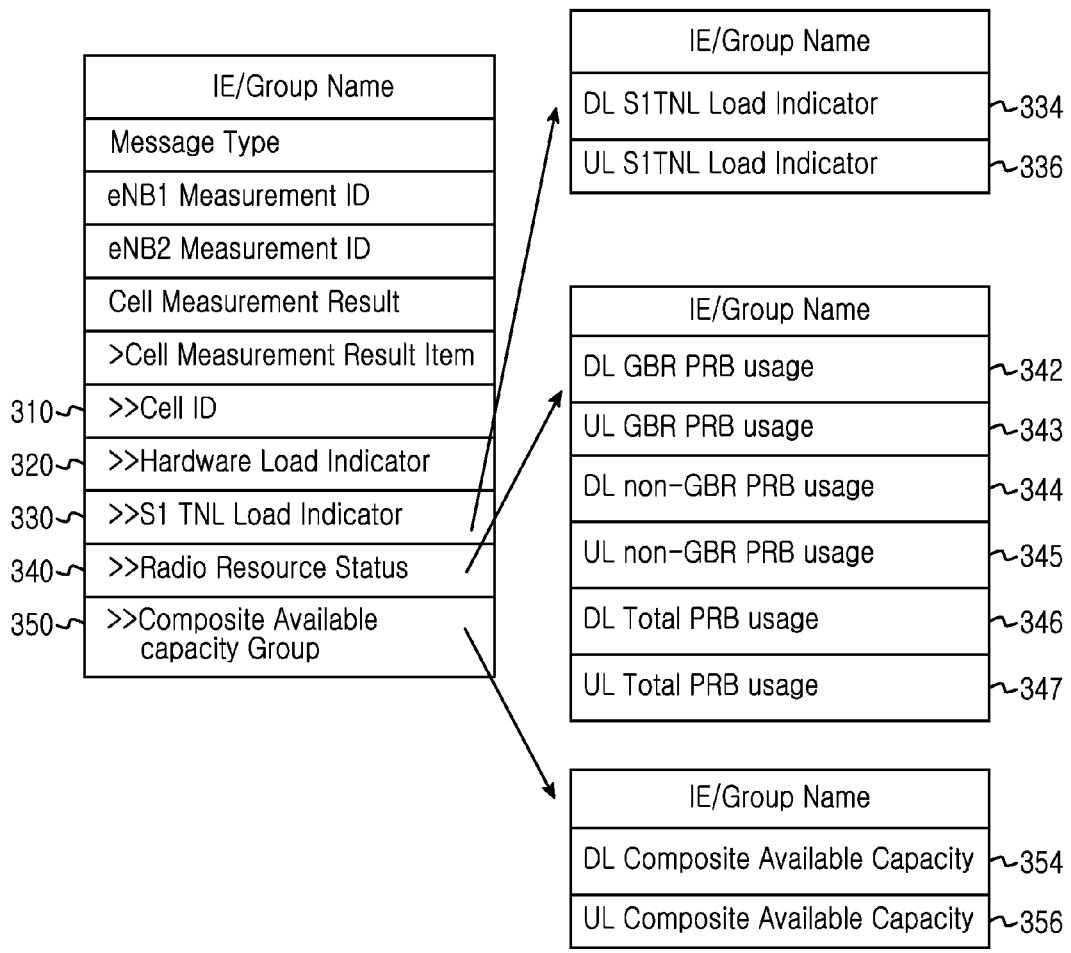
FIG. 15 is a view illustrating cell load information according to another embodiment of the present disclosure.

FIG. 14 is a flowchart illustrating a process flow of a load balancing operation according to another embodiment of the present disclosure. This process flow corresponds to an operation of balancing a load in the case where a portion of an amount of use of radio resources shared between PLMNs exists, and radio resources usable by each PLMN is divided as illustrated in FIG. 4. This operation is periodically performed by the load balancing determine unit 440 illustrated in FIG. 9.

The load balancing determine unit 440 determines whether a cell load for each PLMN of a serving cell is overloaded in operation 910.

In the case where only one of PLMNs is overloaded, operations 920 and 930 are performed in the same way as operations 820 and 830 of FIG. 13. On the contrary, when determining both PLMN1 and PLMN2 are overloaded, operations 935 and 940 are performed.

For example, when determining the PLMN1 is overloaded, the load balancing determine unit 440 selects cells whose PLMN1 cell load is lower than a threshold among neighbor cells as a load balancing object neighbor cell in operation 920.

The load balancing determine unit 440 selectively performs a handover for load balancing on object neighbor cells in operation 930. Various methods for performing a handover for the purpose of load balancing may exist. For example, a method of selecting (a target cell and a target UE), and forcibly performing a handover is considered. According to this method, first, a process of collecting reception signal intensity of PLMN1 UEs for an object neighbor cell is performed. Next, a process for selecting the number of UEs determined according to a load balancing standard and forcibly performing a handover by taking into consideration a load of a candidate neighbor cell and reception signal intensity of a candidate neighbor cell of a candidate PLMN1 UE among various combination objects of (a candidate neighbor cell and a candidate PLMN1 UE) is performed.

For another example, when determining the PLMN1 and the PLMN2 are overloaded simultaneously, the load balancing determine unit 440 selects a PLMN that uses radio resources of a shared portion much, and performs a load balancing operation on the relevant PLMN. Specifically, the load balancing determine unit 440 selects a PLMN that uses radio resources of the shared portion much and selects a load balancing object neighbor cell for the selected PLMN in operation 935. Here, assuming the PLMN that uses radio resources of the shared portion much is the PLMN1, the load balancing determine unit 440 selects cells whose PLMN1 cell load is lower than a threshold among neighbor cells as load balancing object neighbor cells.

The load balancing determine unit 440 selectively performs a handover for load balancing on the object neighbor cells in operation 940. Specifically, the load balancing determine unit 440 selectively performs a handover for load balancing on the object neighbor cells. Various methods for performing a handover for the purpose of load balancing may exist. For example, a method of selecting (a target cell and a target UE), and forcibly performing a handover is considered. According to this method, first, a process of collecting reception signal intensity of PLMN1 UEs for an object neighbor cell is performed. Next, a process for selecting the number of UEs determined according to a load balancing standard and forcibly performing a handover by taking into consideration a load of a candidate neighbor cell and reception signal intensity of a candidate neighbor cell of a candidate PLMN1 UE among various combination objects of (a candidate neighbor cell and a candidate PLMN1 UE) is performed.

When the load balancing determine unit 440 selects only the PLMN1 where an amount of use of the shared portion is much smaller even when the PLMN1 and the PLMN2 are overloaded simultaneously, and the load of the PLMN1 is reduced via performance of the above procedure, an amount of use of the shared portion is reduced. Therefore, resources usable by the PLMN2 increase, and accordingly the load of the PLMN2 reduces. That is, an effect of load balancing for the PLMN1 is represented even for the PLMN2.

Figure 16:
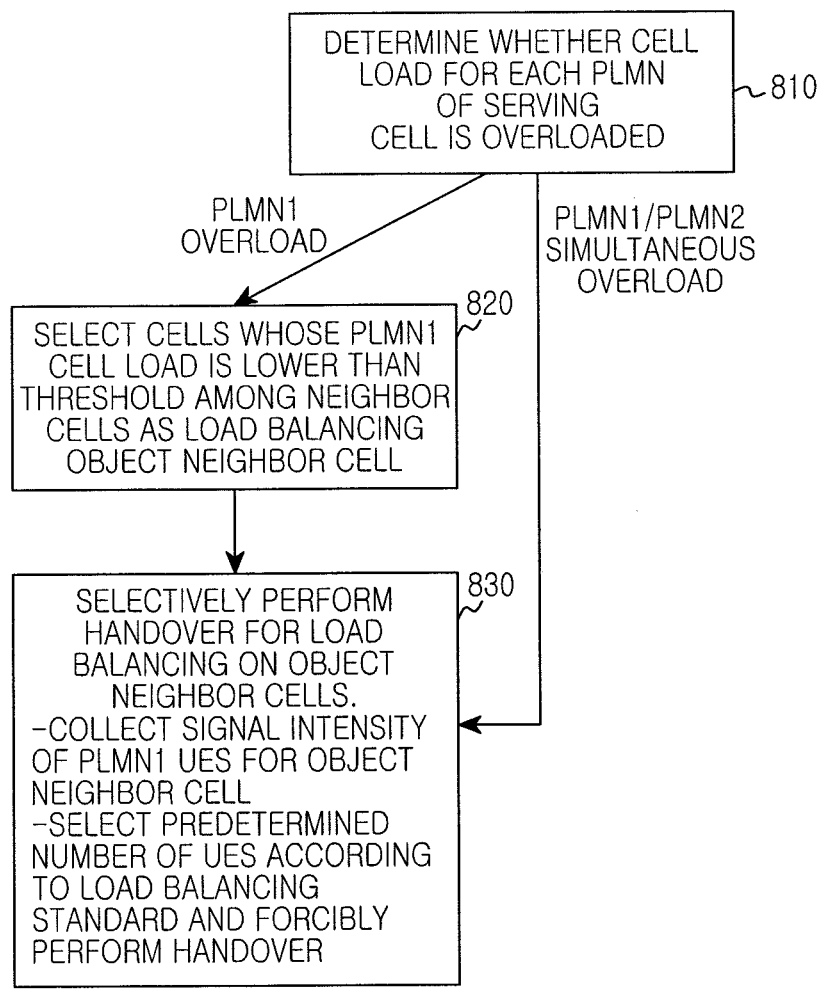
FIG. 16 is a flowchart illustrating a process flow of a load balancing operation according to another embodiment of the present disclosure.

The embodiments of the present disclosure calculate a load for each PLMN, and for performing a load balancing process, cell load information for each PLMN are exchanged. Unlike the embodiments, another embodiment of the present disclosure is applicable to the situation that cell load information for each PLMN cannot be exchanged, and a message for load information on a cell basis defined in 3GPP standard TS 36.423 Rel. 9 only can be exchanged. In this embodiment, a load balancing process is performed for only one PLMN selected by an operator. For example, if a PLMN1 is selected by the operator, a load balancing process of the another embodiment is performed for PLMN1 as shown in FIG. 16. When compared to FIG. 13, a load balancing process of FIG. 16 does not include step 840, but includes steps 820 and 830.

As described above, various embodiments of the present disclosure is for providing a required PLMN-based new load balancing method in the case where a plurality of vendors exist under an MOCN environment and should conform to a current standard, and in the case where a business determines efficient load balancing for a specific PLMN is required. These various embodiments have an effect of calculating a cell load for each PLMN, generating new cell load information, and effectively dispersing a load for a specific PLMN based on cell load information for each PLMN.

Though the present disclosure has been described with reference to limited embodiments and drawings, the present disclosure is not limited to the above embodiments and a person of ordinary skill in the art may modify and change the present disclosure variously from the above description. For example, though the specific embodiment has described two PLMNs existing inside of a cell, the number of PLMNs is not necessarily limited thereto. Also, an operation according to the embodiment of the present disclosure may be recorded on a computer-readable medium including a program instruction for performing an operation implemented by various computers. The computer-readable medium may include a program instruction, a data file, a data structure, etc., or a combination of these. The program instruction may be things specially designed and configured for the present disclosure or things known to and available by a person of ordinary skill in the art. Examples of the computer-readable recording medium include a hard disk, a floppy disk, and a magnetic medium such as a magnetic tape, an optical recording medium such as a CD-ROM or a DVD, a magnetic-optical medium such as a floptical disk, and a hardware device specially configured for storing and performing a program instruction such as ROM, RAM, a flash memory, etc. Examples of the program instruction include not only a machine language code produced by a compiler but also a high level language code executable by a computer using an interpreter, etc. In the case where all or a portion of eNBs described in the present disclosure are implemented as a computer program, a computer-readable recording medium storing the computer program is also included in the present disclosure.

While the present disclosure has been shown and described with reference to various embodiments thereof it will be understood by those skilled in the art that various changes in form and details may be made therein without departing from the spirit and scope of the present disclosure as defined by the appended claims and their equivalents.

What is claimed is:

1. A base station capable of serving at least one terminal via a plurality of Public Land Mobile Networks (PLMNs) in a serving cell, the apparatus comprising:
   a transceiver; and
   a controller configured to:
      acquire first load information for each network of the serving cell,
      determine whether load distribution for a first network of the serving cell is required, based on the first load information for each network of the serving cell and first resource allocation information for each network of the serving cell,
      acquire, if the load distribution for the first network of the serving cell is required, second load information for each network of each neighbor cell and second resource allocation information for each network of the each neighbor cell,
      determine a first target neighbor cell based on the second load information and the second resource allocation information, and
      distribute load for the first network of the serving cell to the first network of the first target neighbor cell.

2. The base station of claim 1, wherein the controller is further configured to distribute the load by performing a handover for at least one terminal from the first network of the serving cell to the first network of the first target neighbor cell.

3. The base station of claim 2, wherein the controller further configured to:
   distribute the load by allowing a number of terminals to perform the handover to the first target neighbor cell.

4. The base station of claim 3, wherein the controller is further configured to:
   select the number of the terminals based on a reception signal intensity of the terminals receiving a service via the first network of the first target neighbor cell and a cell load of the first target neighbor cell, and
   force the selected terminals to perform the handover to the first target neighbor cell.

5. The base station of claim 4, wherein the transceiver configured to receive the reception signal intensity of the mobile terminals receiving the service via the first network of the first target neighbor cell, and configured to receive information regarding a cell load of the first target neighbor cell.

6. The base station of claim 1, wherein the transceiver configured to transmit the first load information for each network of the serving cell to at least one neighbor cell.

7. The base station of claim 6, wherein the transceiver is further configured to transmit the first resource allocation information for each network of the serving cell comprising information regarding a resource allocation ratio for each network of the serving cell.

8. The base station of claim 6, wherein the transceiver is further configured to receive a message including the second load information for each network of each neighbor cell and the second resource allocation information for each network of each neighbor cell.

9. The base station of claim 1, wherein the controller configured to measure load for each network of the serving cell periodically.

10. The base station of claim 1, wherein the controller is further configured to:
    determine whether load distribution for a second network of the serving cell is required, based on the first load information for each network and first resource allocation information for each network of the serving cell,
    determine, if the load distribution for the second network of the serving cell is required, a second target neighbor cell based on the second load information and the second resource allocation information, and
    distribute load for the second network of the serving cell to the second network of the second target neighbor cell.

11. The base station of claim 10, wherein an amount of use of a radio resource of a cell is absolutely allocated to the first network and the second network.

12. The base station of claim 1, wherein a portion of an amount of radio resource use of a cell is shared by the first network and the second network, and a remaining amount of the radio resource use is allocated to the first network and the second network, and the first network uses a portion of the radio resource more than the second network.

13. A method implemented in a base station capable of serving at least one terminal via a plurality of Public Land Mobile Networks (PLMNs) in a serving cell, the method comprising:
    acquiring first load information for each network of the serving cell;
    determining whether load distribution for a first network of the serving cell is required, based on the first load information for each network and first resource allocation information for each network of the serving cell;
    acquiring, if the load distribution for the first network of the serving cell is required, second load information for each network of each neighbor cell and second resource allocation information for each network of the each neighbor cell;
    determining a first target neighbor cell based on the second load information and the second resource allocation information; and
    distributing load for the first network of the serving cell to the first network of the first target neighbor cell.

14. The method of claim 13, wherein the distributing of the load for the first network comprises:
    performing a handover for at least one terminal from the first network of the serving cell to the first network of the first target neighbor cell.

15. The method of claim 14, wherein the distributing of the load for the first network comprises:
    allowing a number of terminals to perform the handover to the first target neighbor cell.

16. The method of claim 14, wherein allowing the number of terminals to perform the handover comprises:
    selecting the number of the terminals based on a reception signal intensity of the terminals receiving a service via the first network of the first target neighbor cell and a cell load of the first target neighbor cell, and
    forcing the selected terminals to perform the handover to the first target neighbor cell.

17. The method of claim 16, further comprising:
    receiving the reception signal intensity of the mobile terminals receiving a service via the first network of the first target neighbor cell, and
    receiving information regarding a cell load of the first target neighbor cell.

18. The method of claim 13, further comprising:
    transmitting the first load information for each network of the serving cell to at least one neighbor cell.

19. The method of claim 18, further comprising:
    transmitting the first resource allocation information for each network of the serving cell comprising information regarding a resource allocation ratio for each network of the serving cell.

20. The method of claim 18, further comprising:
    receiving a message including the second load information for each network of each neighbor cell and the second resource allocation information for each network of each neighbor cell.

21. The method of claim 13, further comprising:
    measuring load for each network of the serving cell periodically.

22. The method of claim 13, further comprising:
    determining whether load distribution for a second network of the serving cell is required, based on the first load information for each network and first resource allocation information for each network of the serving cell,
    determining, if the load distribution for the second network of the serving cell is required second target neighbor cell based on the second load information and the second resource allocation information; and
    distributing load for the second network of the serving cell to the second network of the second target neighbor cell.

23. The method of claim 22, wherein an amount of use of a radio resource of a cell is absolutely allocated to the first network and the second network.

24. The method of claim 13, wherein a portion of an amount of radio resource use of a cell is shared by the first network and the second network, and a remaining amount of the radio resource use is allocated to the first network and the second network, and the first network uses a portion of the radio resource more than the second network.

* * * * *